United States Patent [19]
Bozoian et al.

[11] 3,788,421
[45] Jan. 29, 1974

[54] ELECTRIC CIRCUITRY FOR VEHICLE SPEED RESPONSIVE SYSTEM

[75] Inventors: Michael Bozoian, Ann Arbor; Allen D. Krugler, Jr., Livonia; Bernard G. Radin, Oak Park, all of Mich.

[73] Assignee: Ford Motor Company, Dearborn, Mich.

[22] Filed: July 9, 1971

[21] Appl. No.: 161,145

[52] U.S. Cl. ................. 180/105 R, 180/82, 317/5, 123/102
[51] Int. Cl. ............................................ B60k 27/00
[58] Field of Search... 180/105 R, 105 E, 82; 317/5, 317/148.5; 123/102

[56] References Cited
UNITED STATES PATENTS

| | | | |
|---|---|---|---|
| 3,060,602 | 10/1962 | Buttenhoff | 180/105 X |
| 3,126,989 | 3/1964 | Baumann | 180/105 E |
| 3,201,648 | 8/1965 | Kerr | 317/5 |
| 3,315,134 | 4/1967 | Scholl | 180/105 E |
| 3,356,082 | 12/1967 | Jukes | 123/102 |
| 3,406,775 | 10/1968 | Magnuski | 123/102 |
| 3,517,260 | 6/1970 | Oishi | 123/102 |
| 3,603,612 | 9/1971 | Hill | 180/105 E |
| 3,582,679 | 6/1971 | Carp | 180/105 E |
| 3,581,839 | 6/1971 | Carp | 180/82 |
| 3,613,820 | 10/1971 | Bozoian | 180/105 E |

*Primary Examiner*—Robert G. Sheridan
*Assistant Examiner*—R. B. Johnson

[57] ABSTRACT

A normally nonconducting input transistor receives an alternating signal having a frequency proportional to vehicle speed from a signal generator driven by a vehicle wheel. Positive portions of each cycle of the alternating signal switch the input transistor into its conducting state and a staircase converter connected to the input transistor converts the frequency of the signal into a voltage proportional to vehicle speed. The voltage is supplied to a trigger comprising a control transistor normally in the same nonconducting state as the input transistor and an output transistor connected in series with the winding of a solenoid that controls an item of vehicle equipment.

3 Claims, 2 Drawing Figures

3,788,421
FIG.1
FIG.2
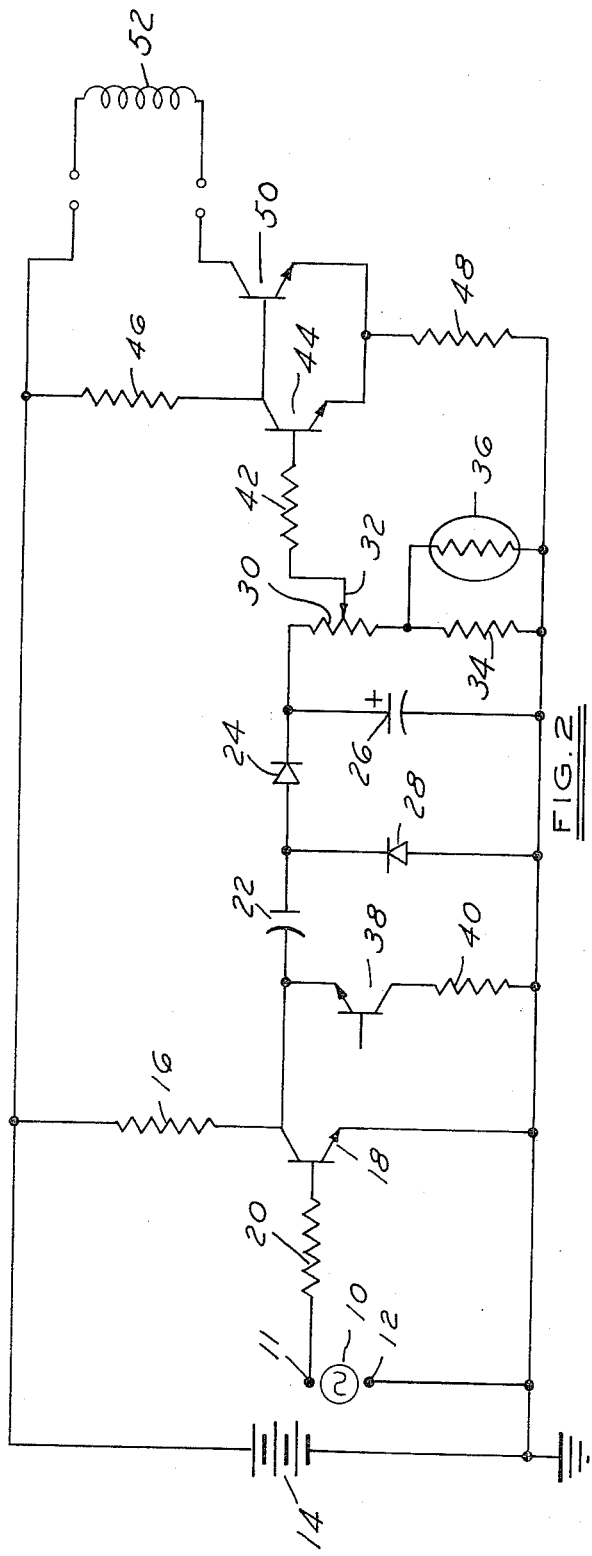
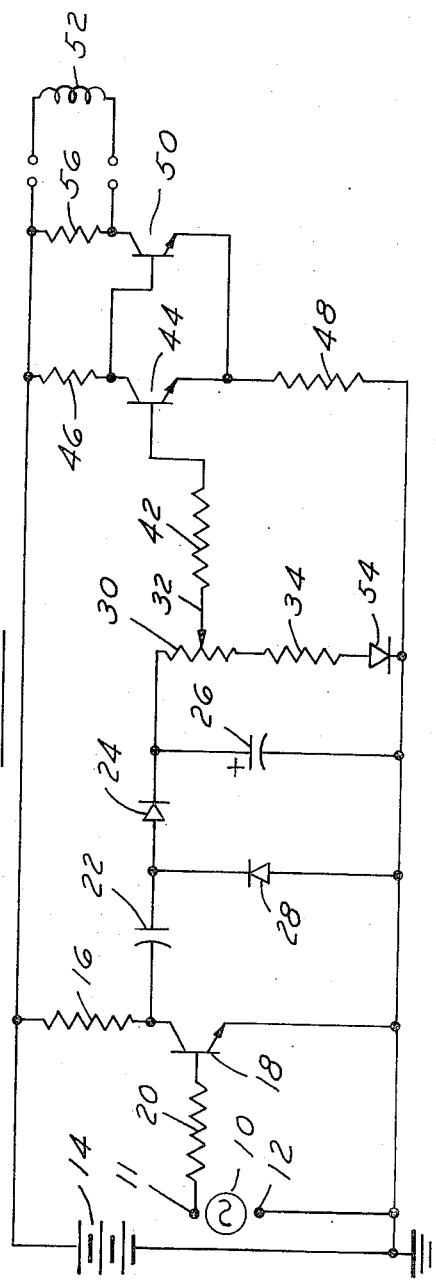
INVENTOR
MICHAEL BOZOIAN
ALLEN D. KRUGLER, JR.
BY BERNARD G. RADIN
John R. Faulkner
Glenn S. Arendsen
ATTORNEYS

ELECTRIC CIRCUITRY FOR VEHICLE SPEED RESPONSIVE SYSTEM

SUMMARY OF THE INVENTION

This invention relates to the subject matter of U.S. patent applications Fitzsimons et al. Ser. No. 853,904, now U.S. Pat. No. 3,647,016, and Bozoian Ser. No. 853,905, now U.S. Pat. No. 3,613,820, both filed Aug. 28, 1969.

These related applications disclose mechanisms and electronic circuitry capable of actuating various items of vehicle equipment as functions of vehicle speed in a highly accurate manner. Such vehicle equipment is exemplified by ignition timing devices and throttle blade control devices that are used to reduce the quantity of undesirable components in engine exhaust gases without interfering significantly with vehicle drivability and performance.

Electronic circuitry having greatly reduced cost but nevertheless providing the accuracy essential to such equipment is provided by this invention. The invention reduces considerably the number of components necessary in the electronic circuitry. In a system for controlling vehicle equipment as a function of vehicle speed including a source of electrical energy and an electrical signal generator connected to a vehicle wheel for producing an alternating signal having a frequency representative of vehicle speed, the electrical circuitry comprises a first electronic switch receiving the alternating signal from the signal generator that normally is in a first state of conduction or nonconduction but is switched into the opposite state by a portion of each cycle of the alternating signal. A staircase converter is connected to the first electronic switch. The converter includes a relatively small capacitor in series with a relatively large capacitor that in turn is in parallel with a temperature compensating device.

A trigger including a second electronic switch and a third electronic switch is connected to the converter. The second electronic switch normally is in the same state of conduction or nonconduction as the first switch while the third electronic switch normally is in the opposite state. Each cycle of the alternating signal acts through the first electronic switch to apply a unit charge to the large capacitor. When these unit charges build up the total charge on the large capacitor to a predetermined switching point, the second electronic switch changes its state of conduction or nonconduction and in turn changes the state of the third electronic switch, which thereby actuates the item of vehicle equipment.

Transistors serve conveniently as each of the electronic switches. The staircase converter preferably comprises a first diode connected between the small capacitor and the large capacitor so the diode conducts current from the small capacitor to the large capacitor. A second diode is connected in parallel with the series connection of the first diode and the large capacitor so it is reverse-biased by the pulses that are transmitted from the small capacitor to the large capacitor. The second diode is in series with the small capacitor and the source of electrical energy and it resets the small capacitor to prepare the small capacitor for subsequent pulses.

The transistor serving as the first electronic switch preferably is biased so it is driven into full conduction by the amplitude of the signals produced by the signal generator at a vehicle speed of about 50 percent of the desired actuation point of the overall circuit. At higher vehicle speeds, the transistor effectively clips the amplitude of the signals to apply a square-wave type of pulse to the small capacitor. The transistor and the small capacitor are selected so the small capacitor is charged fully by very small portions of each signal cycle, preferably about one-tenth to one-hundredth of the signal cycle produced at the desired actuation point of the overall circuit.

Thus the first transistor, the small capacitor, and the large capacitor combine to convert the frequency of the signal from the signal generator into a voltage appearing on the large capacitor that is a virtually exclusive function of the signal frequency. Since the first electronic switch and the second electronic switch normally are in the same state of conduction or nonconduction, the effects of source voltage variations within a considerable range on the actuation point of the circuit are canceled automatically. Further voltage compensation can be achieved by connecting the reverse biased collector-emitter terminals of a transistor having a floating base terminal in parallel with the first switch transistor.

Temperature compensation can be provided by connecting a thermistor or a diode in parallel with the large capacitor. A diode connected in this manner is in parallel with the base-emitter terminals of the transistor serving as the second electronic switch and it effectively cancels the effects of temperature variations on the actuating point of the circuit.

BRIEF DESCRIPTION OF THE DRAWINGS

FIG. 1 is a schematic of an electrical circuit of this invention showing the relationship between the first electronic switch, the staircase converter and the trigger. A thermistor connected in parallel with a large capacitor eliminates the effects of temperature changes on the circuit and a transistor with a floating base terminal is connected across the first electronic switch to eliminate the effects of large voltage variations.

FIG. 2 shows a similar circuit in which a diode in parallel with the large capacitor provides temperature compensation.

Detailed Description

Referring to FIG. 1; a signal generator 10 having the construction and operation described in aforementioned patent application Ser. No. 853,905 has, now U.S. Pat. No. 3,613,820, its leads connected to terminals 11 and 12. Terminal 12 is connected to the negative terminal of a vehicle battery 14 that has its positive terminal connected through a resistor 16 to the collector of an NPN type input transistor 18. Transistor 18 serves as the first electronic switch. A resistor 20 connects terminal 11 to the base of transistor 18 and the emitter of transistor 18 is connected directly to the negative terminal of battery 14.

One plate of a small capacitor 22 is connected to the collector of transistor 18 and the other plate is connected to the anode of a first diode 24. The cathode of diode 24 is connected to one plate of a large capacitor 26 that has its other plate connected to the negative battery terminal. A second diode 28 has its cathode connected to the anode of diode 24 and its anode connected to the negative battery terminal so that diode 28 is in parallel with the series connection of diode 24 and capacitor 26.

A resistor 30 having a variable tap 32 has one end terminal connected to the cathode of diode 24 and the other end terminal connected to the negative battery terminal through a parallel arrangement of a resistor 34 and a thermistor 36. Elements 22–36 combine to make up the staircase converter of the invention.

The emitter of an NPN type transistor 38 is connected to the collector of transistor 18. A resistor 40 connects the collector of transistor 38 to the negative battery terminal and the base terminal of transistor 38 is floating.

A resistor 42 connects tap 32 with the base terminal of an NPN type transistor 44 that serves as the second electronic switch. The collector of transistor 44 is connected through a resistor 46 to the positive battery terminal and the emitter is connected through a resistor 48 to the negative battery terminal.

Another NPN type transistor 50 has its base terminal connected to the collector of transistor 44 and its emitter connected to the emitter of transistor 44. Transistor 50 serves as the third electronic switch. Its collector is connected through the winding 52 of a solenoid to the positive battery terminal.

Typical values and types of components used in the FIG. 1 circuit with a conventional 12 volt automotive type battery are resistor 16, 2.2k ohms; transistors 18, 38 and 44, type 2N2925; capacitor 22, 0.15 microfarad; diodes 24 and 28, type 1N4454; capacitor 26, 10 microfarads; resistor 30, 5k ohms; resistor 34, 5.6k ohms; thermistor 36, 5k at 20°C; resistor 40, 1.5k ohms; resistor 42, 4.7 ohms; resistor 46, 2.2k ohms, resistor 48, 3.3 ohms and transistor 50, type 2N3403.

With no signal at terminals 11 and 12 from the signal generator, transistors 18 and 44 are in a nonconducting state and transistor 50 is conducting so that current is flowing through the solenoid winding 52. The positive portion of each cycle of the signal from the signal generator switches transistor 18 into conduction. A square wave in step with the positive portion of the signal is applied to capacitor 22. The small size of capacitor 22 cooperates with diodes 24 and 28 to eliminate width variations in the square wave and applies the resulting wave to capacitor 26. Capacitor 26 thus receives a unit charge for each cycle of the alternating signal from the signal generator. As the charge on capacitor 26 begins increasing it also begins dissipating through resistor 30, resistor 34 and thermistor 36. If vehicle speed is such that the capacitor reaches a predetermined charge, a tap 32 of resistor 30 supplies that charge to the base of transistor 44 to switch transistor 44 into conduction. Transistor 50 immediately switches into nonconduction.

FIG. 2 is similar to FIG. 1 except for the absence of transistor 38, resistor 40 and thermistor 36, the addition of a diode 54 and the addition of a resistor 56. Diode 54 has its anode connected to resistor 34 and its cathode connected to the negative battery terminal so that the diode is in series with resistor 34. Resistor 56 is connected in parallel with solenoid winding 52. Diode 54 is a type 1N4454 and resistor 56 is 510 ohms.

Operation is similar to that of FIG. 1 except that transistor 18 is biased rapidly into full conduction by very small signals from the signal generator. Transistor 18 thus effectively clips the resulting wave form applied to capacitor 22 at a low value that eliminates amplitude variations. Diode 54 is in parallel with the base-emitter terminals of transistor 44. Temperature effects thus are applied to both the base-emitter junction of the transistor and to the diode and because of the parallel connection, the temperature effects are cancelled from the overall circuit operation. Resistor 56 limits transient voltages resulting from opening the inductive load of winding 52 to a value less than the collector-base breakdown voltage of transistor 50.

Thus this invention providea a greatly simplified electronic circuit for converting accurately the frequency of signals from a vehicle driven signal generator into an output signal for actuating an item of vehicle equipment. The circuit inherently compensates for anticipated variations in the source voltage of the vehicle and utlizes an inexpensive diode connection for anticipated temperature variations.

1. In a system for controlling vehicle equipment as a function of vehicle speed of the type having a source of electrical energy, an electrical signal generator for producing an alternating signal having a frequency representative of vehicle speed, an electrical circuit responsive to the alternating signal for producing an output signal, independent of variations in the electrical source within a preselected range, the electrical circuit including a first electronic switch means receiving the alternating signal from the generator and switchable from a first state of conduction or nonconduction to the opposite state during a portion of each cycle of the alternating signal, a staircase converter circuit connected to the first switch and including a relatively small capacitor in series with a relatively large capacitor, a second electronic sswitch means having a base-emitter junction in parallel with the relatively large capacitor, the second switch means normally being in the same first state of conduction or nonconduction as the first electronic switch means and switchable to the opposite state when the charge accumulated by the relatively large capacitor reaches a preselected value and a third electronic switch means arranged to remain in a state of conduction or nonconduction opposite to the second electronic switch means to control electrical energization of the vehicle equipment, the improvement comprising voltage divider means in parallel with the relatively large capacitor and with the second electronic switch means base-emitter junction divider means and temperature compensating means cooperative to modulate the level of charge of the relatively large capacitor to compensate for the temperature induced variations in the first, second and third electronic switch means.

2. The system of claim 1 wherein the voltage divider means comprise a resistive voltage divider network having first and second series connected resistive portions, and the temperature compensating means comprise a thermistor connected in parallel with one of said first and second series connected resistive portions.

3. The system of claim 1 wherein the voltage divider means comprise a resistive voltage divider network having first and second series connected resistive portions and said temperature compensating means comprise a solid state diode connected in series with said resistive voltage divider network series connected portions and having its anode in electrical communication with the base of the second electronic switch means and its cathode in electrical communication with the emitter of the second electronic switch means.

* * * * *